H. M. WELCH.
Steam Cooking-Apparatus.
No. 157,897.
Patented Dec. 15, 1874.
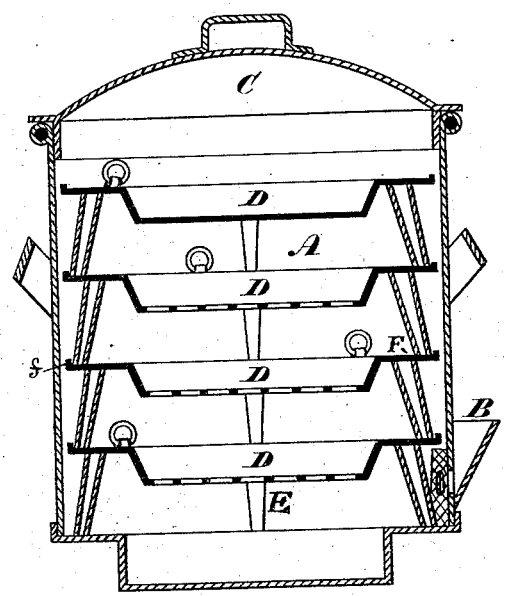
Witnesses.
John Grist, Junr.
John. S. Grist
H M Welch
Inventor
by Henry Grist
Attorney.

UNITED STATES PATENT OFFICE.

HARLOW MINER WELCH, OF COWANSVILLE, CANADA.

IMPROVEMENT IN STEAM COOKING APPARATUS.

Specification forming part of Letters Patent No. 157,897, dated December 15, 1874; application filed November 9, 1874.

*To all whom it may concern:*

Be it known that I, HARLOW MINER WELCH, of the village of Cowansville, in the county of Missisquoi, in the Province of Quebec, Canada, have invented certain new and useful Improvements in Steam Cooking Apparatus; and I do hereby declare that the following is a full, clear, and exact description of the same.

This invention relates to a cooking utensil in which can be steamed various kinds of food within the chamber in which the steam is generated; and it consists of a steam-generating vessel or pot, to be placed over the fire, having a series of perforated dishes loosely fitting therein to receive the food, and provided with legs to stand on the rim of the next lowest dish, the legs of the lowest dish standing on the bottom of the vessel.

The drawing represents a vertical section of my cooking apparatus.

A is the steaming-vessel, preferably made with a sunken bottom to form a water-reservoir, such sunken portion fitting in the hole of a stove. B is a lipped orifice in the wall of the vessel A, above water-line, to feed water to the reservoir without disturbing the food vessels or dishes, should such feeding be required, and which orifice may, if desired, be provided with a slide to close the orifice, and a wire-gauze screen to prevent the ingress of foreign substances with the water; or a cover to shut on the lip may be furnished, if preferred. The vessel A is provided with a concavo-convex cover, C, having a rim closely fitting within the same, to cause the condensed water to trickle down the wall of the vessel. D are a series of perforated dishes, fitting loosely within the steaming-chamber A, on which the various kinds of food to be cooked are placed. These dishes are provided with legs E to bear on the rim of the next lowest dish, the lower dish standing on the bottom of the vessel.

The water-reservoir is supplied with a small quantity of water, and as but little of the steam will escape, the waste of water will be slight; consequently the reservoir will seldom need replenishing, and a very small quantity of water will suffice to generate the steam; and hence but a slight fire will suffice to cook the food by the steaming process.

Several kinds of food can be cooked within the steaming-chamber at the same time, and each will retain its own particular flavor, and with a small steamer a large amount of food can be cooked, owing to the compactness of the food-dishes, and of their arrangement within the steamer, thus obviating the employment of a multiplicity of vessels for cooking an ordinary dinner, and by confining the steam within the chamber no odor in cooking can escape into the apartment.

The space between each dish permits the steam to approach the food on all sides. The imperforate rim F forms a substantial rest for the supports of the dish above. The lip $f$ acts as a guide in placing the dishes in position. The dishes are handled by suitable rings or handles attached to the dish-rim.

The following is claimed as new:

As an improvement in a steaming-vessel, the combination of the boiler A and the dishes D, having imperforate supporting rims and legs E, substantially as described, for the purpose set forth.

H. M. WELCH.

Witnesses:
    E. F. CURRIE,
    A. D. ELLIS.